US012767255B2

(12) United States Patent
Billund et al.

(10) Patent No.: US 12,767,255 B2
(45) Date of Patent: Oct. 20, 2026

(54) KIT-OF-PARTS FOR MOBILE ROBOTS

(71) Applicant: Roeq ApS, Vissenbjerg (DK)

(72) Inventors: Stig Billund, Odense S (DK); Carsten Sørensen, Herlev (DK); Michael Ejstrup Hansen, Morud (DK)

(73) Assignee: Roeq ApS, Vissenbjerg (DK)

( * ) Notice: Subject to any disclaimer, the term of this patent is extended or adjusted under 35 U.S.C. 154(b) by 365 days.

(21) Appl. No.: 18/698,299

(22) PCT Filed: Oct. 4, 2022

(86) PCT No.: PCT/EP2022/077579

§ 371 (c)(1),
(2) Date: Apr. 3, 2024

(87) PCT Pub. No.: WO2023/057447

PCT Pub. Date: Apr. 13, 2023

(65) Prior Publication Data

US 2024/0391544 A1 Nov. 28, 2024

(30) Foreign Application Priority Data

Oct. 4, 2021 (DK) .......................... PA 2021 00941

(51) Int. Cl.

| | |
|---|---|
| ***B62D 63/02*** | (2006.01) |
| ***B62D 37/04*** | (2006.01) |
| ***B65G 1/04*** | (2006.01) |
| *B60G 7/00* | (2006.01) |

(52) U.S. Cl.

CPC ............ *B62D 63/02* (2013.01); *B62D 37/04* (2013.01); *B65G 1/04* (2013.01); *B60G 7/001* (2013.01)

(58) Field of Classification Search

CPC .......... B62D 63/02; B62D 37/04; B65G 1/04; B60G 7/001

See application file for complete search history.

(56) References Cited

U.S. PATENT DOCUMENTS 11,260,922 B2 * 3/2022 Ishikawa ............... B62D 61/12
12,162,681 B2 * 12/2024 Bigari ................. B65G 1/0492

(Continued)

FOREIGN PATENT DOCUMENTS

CN 207028815 U 2/2018
CN 108263157 A 7/2018

(Continued)

OTHER PUBLICATIONS

Dannish Search Report for PA202100941 dated Mar. 30, 2022, 4 pages.

(Continued)

*Primary Examiner* — Brian L Swenson

(74) *Attorney, Agent, or Firm* — Nixon & Vanderhye P.C.

(57) ABSTRACT

A kit of parts (100) is provided, for use with a mobile robot (10) comprising a chassis (12) and a drive assembly (14) having at least one driven wheel (16) and at least one non-driven wheel (18). Said kit of parts (100) comprises a top module (110) configured to be mounted on top of the mobile robot (10) and to add additional weight to the mobile robot (10), and at least one weight redistribution module (120) comprising a biasing member (122) configured to redistribute load from the non-driven wheel(s) (18) to the driven wheel(s) (16) of the mobile robot (10).

14 Claims, 12 Drawing Sheets

(56) References Cited

U.S. PATENT DOCUMENTS

| | | | | |
|---|---|---|---|---|
| 12,258,068 | B2 * | 3/2025 | Qiao | B62D 21/18 |
| 12,275,473 | B2 * | 4/2025 | Jensen | B62D 63/04 |
| 12,459,348 | B2 * | 11/2025 | Cederwall | G05D 1/024 |
| 2020/0254607 | A1 * | 8/2020 | Ejstrup Hansen | B25J 11/008 |
| 2020/0369501 | A1 * | 11/2020 | Zou | B62D 63/04 |
| 2022/0363329 | A1 * | 11/2022 | Jensen | B62D 63/04 |
| 2024/0042845 | A1 * | 2/2024 | Cederwall | B60G 7/001 |
| 2024/0109590 | A1 * | 4/2024 | Jo | B62D 21/14 |
| 2024/0166010 | A1 * | 5/2024 | Song | B60G 17/0165 |

FOREIGN PATENT DOCUMENTS

| | | | |
|---|---|---|---|
| CN | 110116769 | A | 8/2019 |
| CN | 113086048 | A | 7/2021 |
| EP | 3800113 | A1 | 4/2021 |
| KR | 20170010184 | A | 1/2017 |
| WO | 2014092304 | A1 | 6/2014 |
| WO | 2019063816 | A1 | 4/2019 |
| WO | 2021019383 | A1 | 2/2021 |
| WO | 2021076519 | A1 | 4/2021 |
| WO | 2021151786 | A1 | 8/2021 |

OTHER PUBLICATIONS

International Search Report for PCT/EP2022/077579 mailed Feb. 15, 2023, 2 pages.

Written Opinion of the International Searching Authority for PCT/EP2022/077579 mailed Feb. 15, 2023, 6 pages.

* cited by examiner

KIT-OF-PARTS FOR MOBILE ROBOTS

CROSS-REFERENCE TO RELATED APPLICATIONS

This application is the U.S. national phase of International Application No. PCT/EP2022/077579 filed Oct. 4, 2022 which designated the U.S. and claims priority to DK PA 2021 00941 filed Oct. 4, 2021, the entire contents of each of which are hereby incorporated by reference.

TECHNOLOGY FIELD

The present invention relates to mobile robots, and to a kit-of-parts for improving the performance of mobile robots.

BACKGROUND

Mobile robots are automated guided vehicles being programmed to operate in both indoor and outdoor logistics environments. These robots are widely used to transport various objects, goods or articles, either on top of the robot itself or by pulling, pushing and/or lifting a cart being loaded by goods. Mobile robots typically have different wheel/drive configurations comprising passive (non-driven) and active (motor-driven) wheels. The total weight of the mobile robot is often distributed to the wheels of the mobile robot in order to provide the desired operational characteristics, e.g. in terms of stability and driving performance.

In situations where the weights of goods to be transported are very heavy compared to the weight of the mobile robot, several challenges arise for the mobile robot. Challenges may differ for different types of mobile robots and depending on respective wheel/drive configurations, but they generally include insufficient traction between the mobile robot's driven wheels and the ground. Transportation of heavy goods is particularly challenging during e.g. accelerating, decelerating or reversing movements of the mobile robot, ground inclinations, and/or quick turns. Accordingly, the driving performance of the mobile robot is negatively affected due to wheel slipping which causes an undefined or undesired driving behavior. The wheels furthermore risk being damaged.

A mobile robot is typically designed to operate well within "normal" load conditions. However, if a mobile robot is suddenly programmed to carry a heavy load insufficient traction will cause the undesired driving behavior discussed above. This is particularly the case when the mobile robot is assigned to connect to heavy loaded carts, which may weigh up to 1000 kg or more. This is substantially greater than the total weight of the mobile robot, which normally is between 200-300 kg.

Technical solutions known in the art to the above formulated problems involve arranging a top module to the mobile robot for adding additional weight and thereby increasing the traction with the ground. Moreover, some solutions involve mounting additional weights to the mobile robot, either on the top of the mobile robot, together with the top module, or even somewhere in the drive/wheel configuration. Known solutions involving a heavier weight of the mobile robot have proven to be successful to some extent, however when the total weight of the cart to be transported increases to the amount mentioned above (which is quite common in some applications), added weight to the mobile robot will not solve the problem of undesired driving performance.

There is thus a need for improvements in view of the prior art.

SUMMARY

An object of the present disclosure is to provide a kit-of-parts, a mobile robot, and a method which seek to mitigate, alleviate, or eliminate one or more of the above-identified deficiencies in the art and disadvantages singly or in any combination.

Especially, one idea of the present invention is to improve traction by providing a kit-of-parts which is designed to add weight to the mobile robot, as well as to redistribute the force acting on the different wheels of the mobile robot.

According to a first aspect, a kit of parts is provided. The kit of parts is configured for use with a mobile robot comprising a chassis and a drive assembly having at least one driven wheel and at least one non-driven wheel. The kit of parts comprises a top module configured to be mounted on top of the mobile robot and to add additional weight to the mobile robot, and at least one weight redistribution module comprising a biasing member configured to redistribute load from the non-driven wheel(s) to the driven wheel(s) of the mobile robot.

Each driven wheel may be pivotally connected to an associated non-driven wheel with respect to a pivot point. This is advantageous in that it facilitates force distribution between the non-driven wheel(s) and the driven wheel(s), as they are mechanically coupled.

The biasing member may be mounted to press the at least one driven wheel towards the ground. The driven wheel will consequently experience an increased weight, thereby redistributing the forces acting on the wheels of the mobile robot.

The biasing member may be connected to the at least one driven wheel and to the chassis. Hence, it is possible to utilize the intrinsic weight of the mobile robot to redistribute the forces acting on the wheels.

Each driven wheel may be pivotally connected to an associated non-driven wheel by means of a bogie arm. This allows for a simple, yet robust, connecting of the driven wheels to the non-driven wheels.

Each bogie arm may comprise a protruding portion, wherein the biasing member is connected to the protruding portion at a first end and to the chassis at a second end. This is advantageous in that very easy installation of the kit of parts is enabled.

The biasing member may be selected from the group comprising a spring, a pneumatic device, a hydraulic device and a pulley assembly. It is thus possible to make use of standard components for providing the desired effects.

The top module may comprise at least one weight being mounted to add the additional weight to the mobile robot. By using extra weights it is possible to tune the exact weight of the top module, thereby providing efficient means to accurately design a desired behavior of the mobile robot especially when pulling a cart.

The at least one weight may be arranged to shift the center of mass of the mobile robot. This provides additional force redistribution, as the additional weight will be distributed across the wheels in a different manner as compared to when no top module is mounted to the mobile robot.

The top module may comprise a transmission mechanism configured to lift a transmission element into engagement with an associated cart for adding at least at least a part of the weight of the cart as additional weight to the mobile robot. This has proven to be advantageous in that improved traction is effected by letting the mobile robot carry some load from the cart.

The transmission mechanism may comprise one or more force applying devices being mounted to apply a vertically upwards force to the cart for adding additional weight to the mobile robot. Hence the transmission mechanism is configured to in a very reliable manner establish contact between the top module and the cart, and at the same time applying a pressing force upwards to the cart.

The one or more force applying devices may be selected from the group comprising a spring, a pneumatic device, a hydraulic device and a pulley assembly. It is thus possible to make use of standard components for providing the desired effects.

According to a second aspect, a mobile robot is provided. The mobile robot comprises a kit of parts according to the first aspect.

According to a third aspect, a method is provided. The method is performed for improving the traction of a mobile robot comprising a chassis and a drive assembly having at least one driven wheel and at least one non-driven wheel. The method comprises: i) providing a top module configured to be mounted on top of the mobile robot and to add additional weight to the mobile robot, and ii) providing at least one weight redistribution module comprising a biasing member configured to redistribute load from the non-driven wheel(s) to the driven wheel(s) of the mobile robot.

Optionally, the method may comprise iii) mounting the kit of parts to the mobile robot, and iv) connecting the mobile robot to an associated cart.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale; emphasis instead being placed upon illustrating the example embodiments.

DETAILED DESCRIPTION OF THE EMBODIMENTS

Figure 1A:
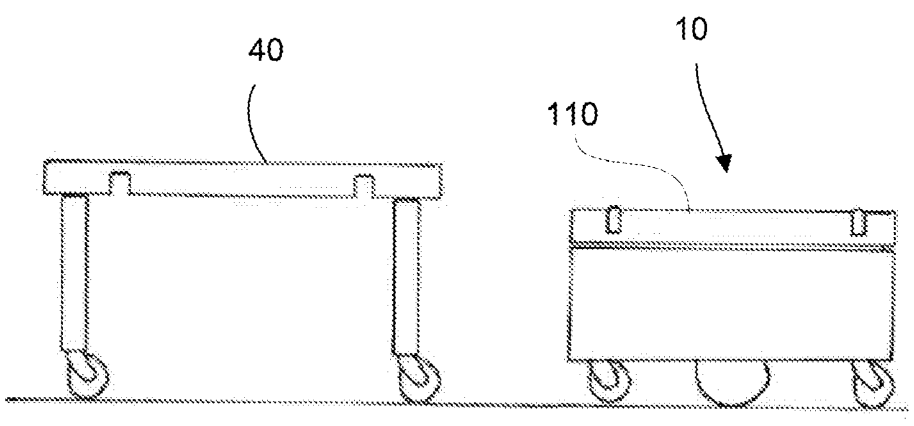
FIGS. 1a-c are respective side views of a use of mobile robot according to one embodiment.
Figure 1B:
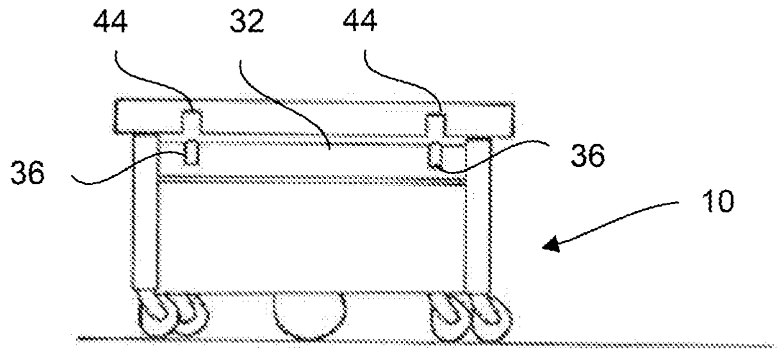
Figure 1C:
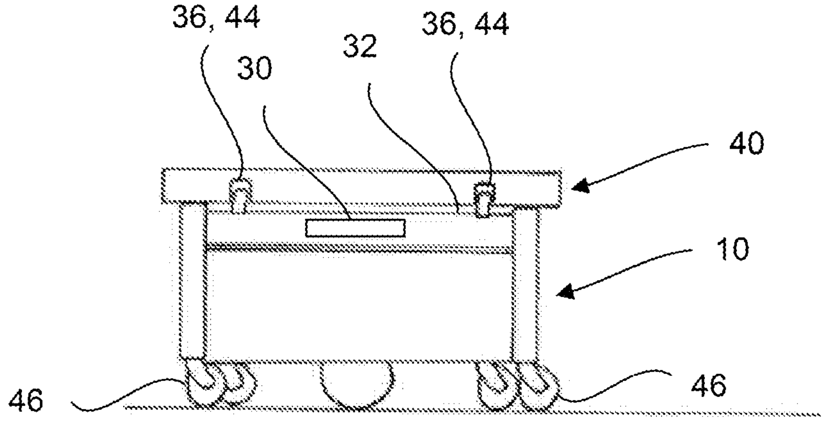

With reference to FIGS. 1a-c the problem of mobile robots transporting heavy loaded carts will be further explained. In FIG. 1a, a mobile robot 10 is approaching a cart 40, with the goal of securing the cart 40 to the mobile robot 10 for transport purpose. Although not shown, it is assumed that the cart 40 is loaded with significant weight, typically in the range of 500 kg or more, such as 1000 kg or more. In FIG. 1b, the mobile robot 10 is aligned with the cart 40, so that the cart 40 is ready to receive one or more vertically extending pins 36 of the mobile robot 10 by means of vertical recesses 44 arranged at the underside of the cart 40. In FIG. 1c, the pins 36 engage vertically with the recesses 44 of the cart 40. The cart 40 is thus locked to the mobile robot 10. As the cart 40 is provided with swivel wheels 46, the cart 40 will be able to follow the movement of the mobile robot 10 without the need for the mobile robot 10 to lift the cart 40.

Figure 2:
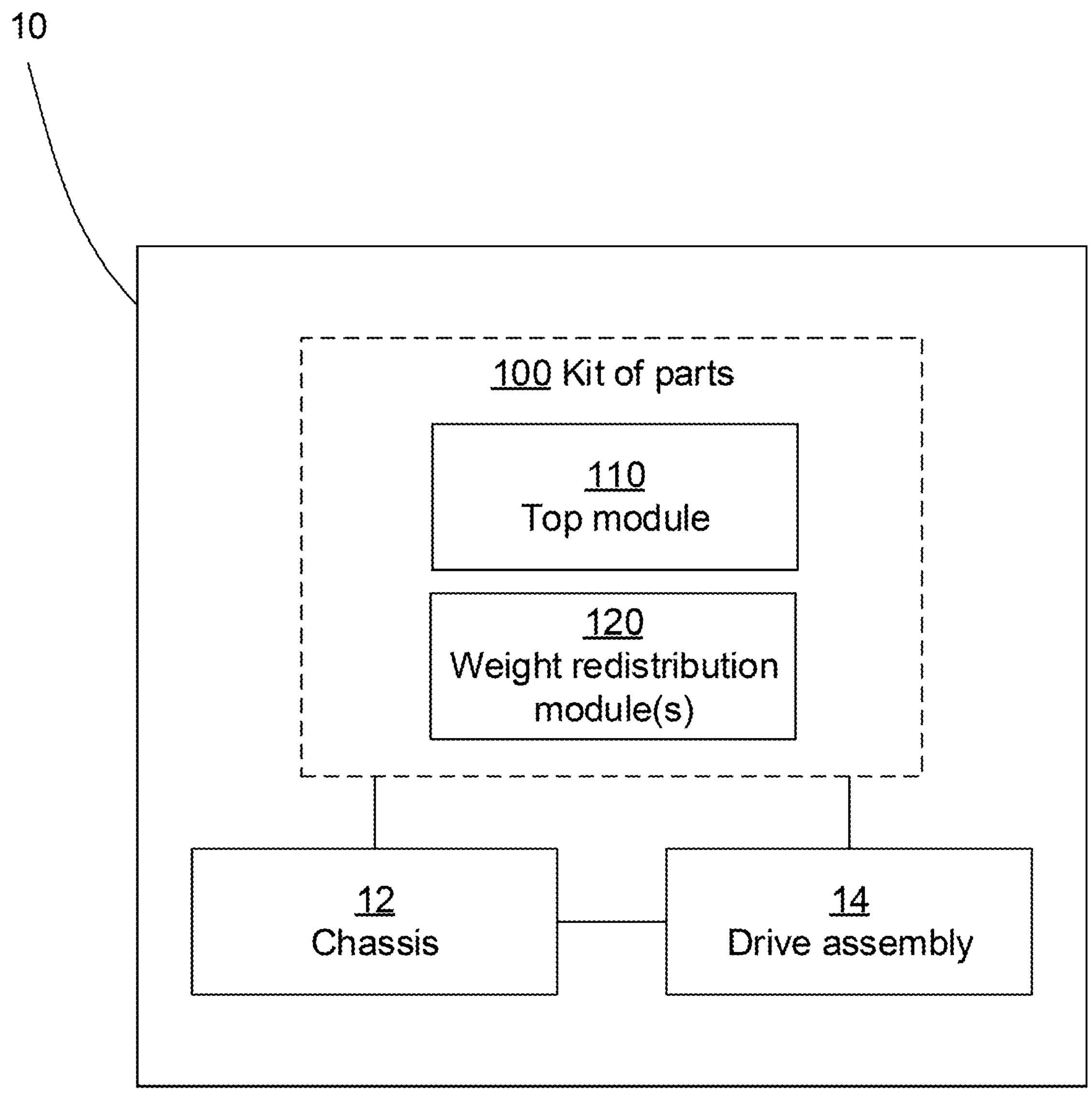
FIG. 2 is a schematic block diagram of a mobile robot comprising a kit of parts according to an embodiment.

With reference to FIG. 2, a schematic block diagram of parts of a mobile robot 10 is shown, which mobile robot 10 is configured to solve the above-mentioned drawbacks. The mobile robot 10 comprises a kit of parts 100, a chassis 12 and a drive assembly 14.

The chassis 12 of the mobile robot 10 defines the supportive structure of said mobile robot 10. The chassis 12 may have any type of suitable shape commonly used in mobile robots 10, typically rectangular, beam-like, etc. The drive assembly 14, being connected to the chassis 12, forms part of the mobile robot 10 and is adapted to drive the mobile robot in a controlled direction, as well as to stabilize the motion of the mobile robot 10. The drive assembly 14 may comprise one or more electric motors being connected to one or more driven wheels of the mobile robot 10. A common electric motor can be provided for all of the driven wheels in the mobile robot 10. Alternatively, each driven wheel may be associated with and driven by a separate electric motor. The electric motor can for instance be a brushless DC motor, integrated motor drive, linear actuator, PMDC brush motor, stepper motor or mobility gearmotor.

The kit of parts 100 comprises a top module 110. The top module 110 is provided as a separate part, i.e. it is pre-manufactured and later mounted/connected to the mobile robot 10. It should be mentioned that the top module 110 could in some embodiments be integrated with the mobile robot 10, i.e. the top module 110 forms part of the mobile robot 10. The top module 110 can be connected to the mobile robot 10 such that it is capable of travelling from a first location to a second location, with carts, racks, and similar equipment to which goods are placed and which goods are intended to be transported. Hence, in preferred embodiments the top module 110 is provided with means (e.g. pins 36) for connecting the mobile robot to an associated cart, as is shown in FIGS. 1*a-c*. Although not visualized in the figure, the top module 110 may be adapted to house a plurality of different electronic components, e.g. a controller unit and one or more sensor units. The controller unit can, for instance, be configured to transmit control signals to the drive assembly 14, thereby providing a controlled driving. To this end, the controller unit may be implemented in any known controller technologies including but not limited to microcontroller, processor (e.g. PLC, CPU, DSP), FPGA, ASIC or any other suitable digital and/or analog circuitry capable of performing the intended functionality. The one or more sensor units of the top module 110 may be configured to detect, for instance, spatial surroundings, weights/applied pressure of goods being arranged on the top module 110, center of mass of the top module 110 and/or the mobile robot 10, and so forth. To this end, the sensor units may be based on technologies including but not limited to optical sensors, ultrasonic sensors, inductive sensors, magnetic sensors, photoelectric sensors, capacitive sensors, pneumatic sensors, weight or pressure sensors, motion sensors, cameras, electromechanical switches, or any combination thereof. The sensor units may be configured to transmit the detected signals to the controller unit such that the controller unit can e.g. further instruct the drive assembly 14. Moreover, the sensor units may be configured to operate in conjunction with one or more facility beacons being arranged in the associated logistics facility for providing accurate positioning signals, e.g. using RADAR, LIDAR, BLE, WiFi or UWB technologies.

The top module 110 is associated with a particular weight. Hence, upon the top module 110 being connected to the mobile robot 10, the top module 110 is configured to add additional weight to the mobile robot 10. In one embodiment, the weight of the top module 110 is fixed. In another embodiment, the weight of the top module 110 is adjustable by adding or removing weights to and from the top module 110. The weight of the top module 110 may be adapted depending on motor configurations and/or load capacities of the mobile robot 10.

The kit of parts 100 comprises at least one weight redistribution module 120. The weight redistribution module (s) 120 may be arranged with the drive assembly 14. More specifically, the weight redistribution module(s) 120 may be arranged together with associated driven wheels of the drive assembly 14. Even more specifically, a separate weight redistribution module 120 may be arranged at a respective driven wheel of the drive assembly 14. The weight redistribution module is configured to redistribute load from the non-driven wheels of the drive assembly 14 to the driven wheels of the drive assembly 14.

Figure 3A:
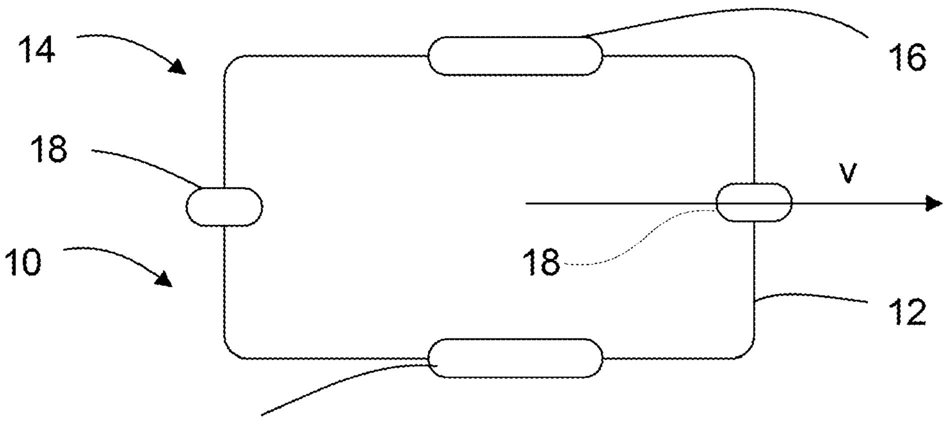
FIGS. 3a-c are schematic bottom views of different mobile robots known in the art.
Figure 3B:
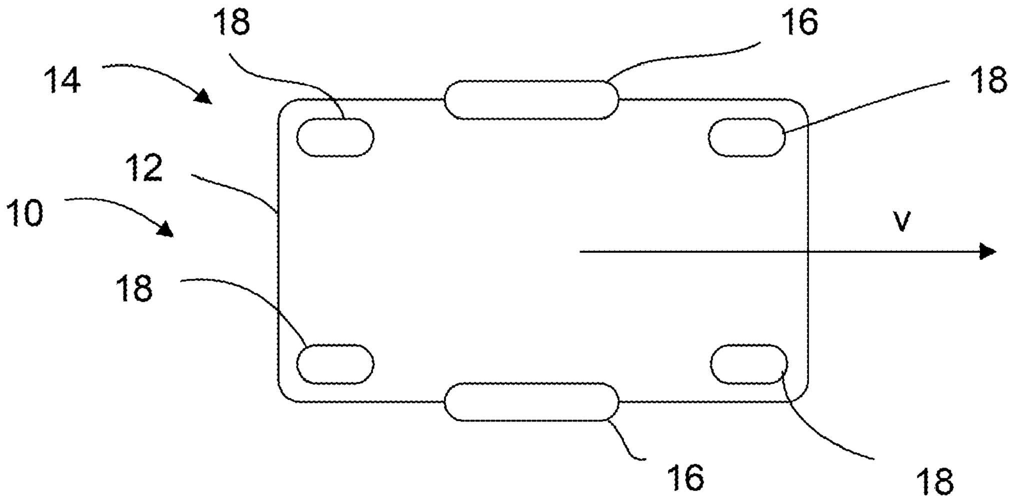
Figure 3C:
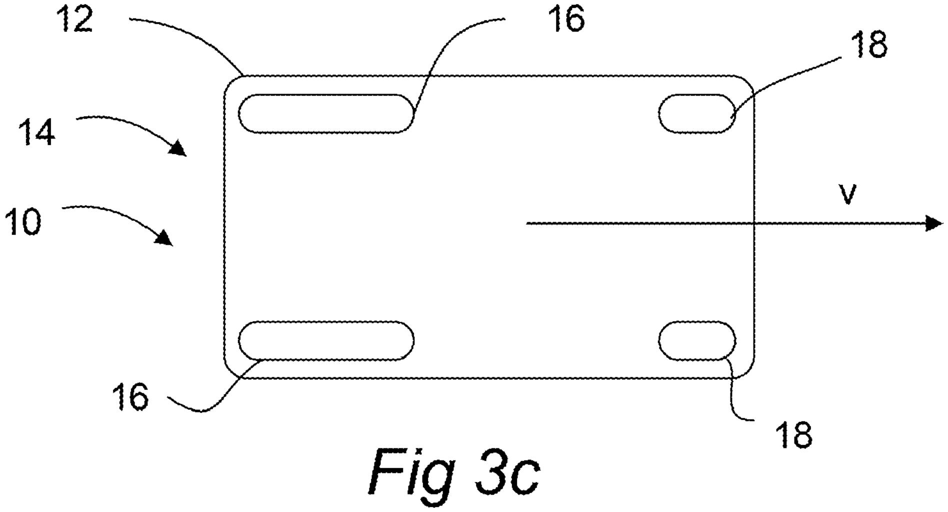

FIGS. 3*a-c* show different types of drive assemblies 14 for mobile robots 10 known in the art in which the inventive concepts of the present disclosure can be realized. Any alternative type of wheel or drive assembly configurations may be realized. The mobile robot 10 is therefore not restricted to the drive assemblies 14 shown in FIGS. 3*a-c*. FIG. 3*a* shows a drive assembly 14 for a differential drive type mobile robot 10. FIG. 3*b* shows a drive assembly 14 for another type of mobile industrial robot. FIG. 3*c* shows a drive assembly 14 for another commercially available mobile robot.

The mobile robots 10 are illustrated as bottom views, and the arrow (v) indicates their respective driving direction. As seen in the figures, the drive assemblies 14 comprise a respective mix of driven wheels 16 and non-driven wheels 18. The driven wheel(s) 16 are connected to a common electric motor and/or one motor for each driven wheel 16, which is/are adapted to drive the wheel 16 in a forward or backwards direction. The non-driven wheels 18 may be rotational wheels being 360° rotatable around its own axis. For instance, the non-driven wheels 18 are swivel casters, or similarly. The non-driven wheels 18 are adapted to provide stability to the mobile robot 10.

Figure 4A:
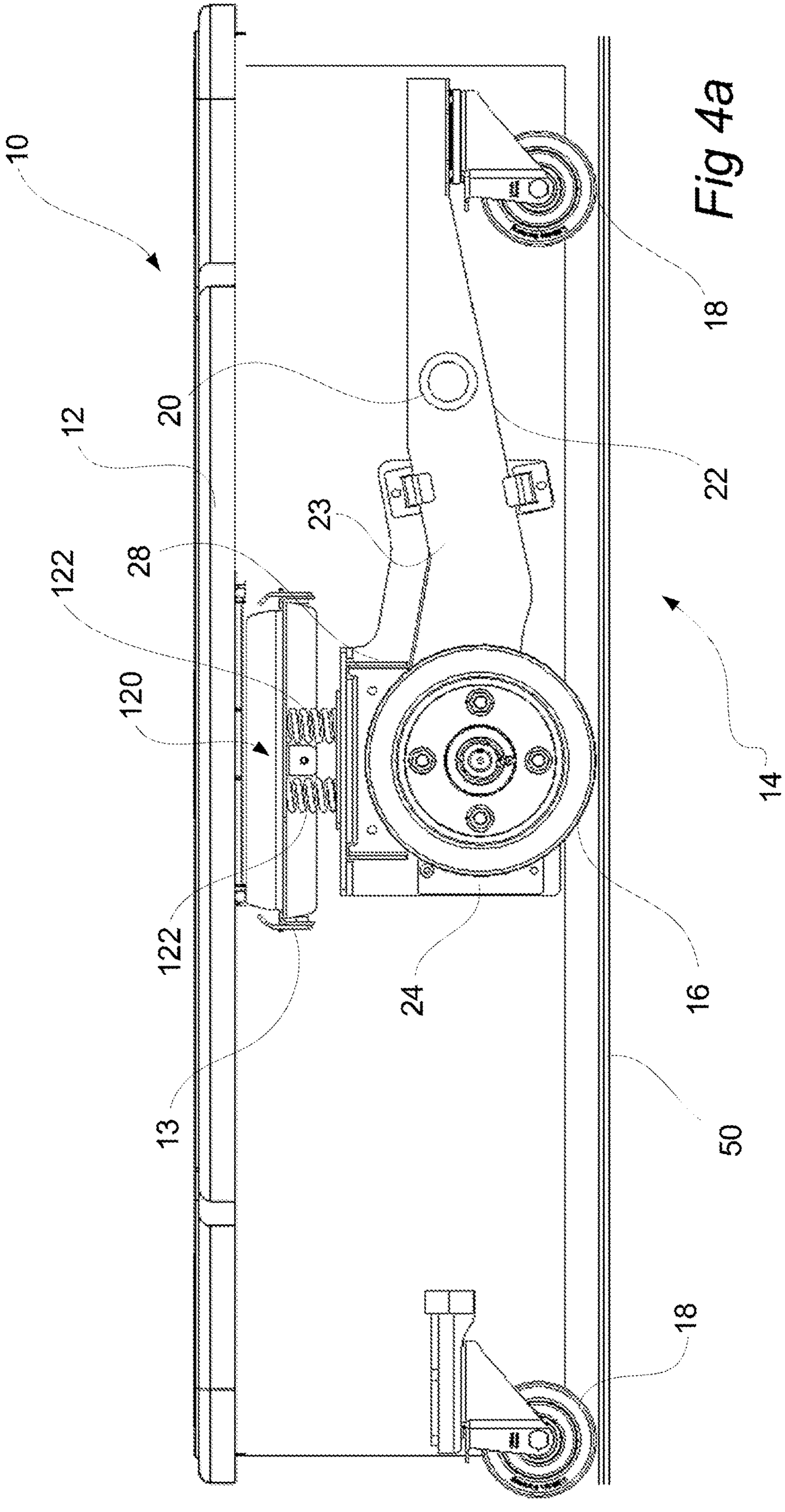
FIG. 4a is a schematic side view of a mobile robot drive assembly according to an embodiment.

FIG. 4*a* shows a side view of a drive assembly 14 of a mobile robot 10 being provided with a kit-of-parts according to one embodiment. The mobile robot 10 is shown to be driving on the ground 50, and the drive assembly 14 is in this example configured according to the drive assembly 14 of the mobile robot 10 shown in FIG. 3*b*. Accordingly, FIG. 4*a* shows a simplified version of one side of a drive assembly 14 of a mobile robot 10. The drive assembly 14 comprises a non-driven wheel 18 being arranged generally at a front corner position of the mobile robot 10, and a driven wheel 16 being generally arranged in a longitudinal side position of the driving direction of the mobile robot 10, i.e. rearwise of the non-driven wheel 18. A further non-driven wheel 18 is provided at a rear corner position of the mobile robot 10. For simplification purposes, the opposite side driven wheel 16 is not shown, although a similar construction as shown in FIG. 4*a* may be realized for said opposite side driven wheel 16 as well.

The driven wheel 16 is pivotally connected to the non-driven wheel 18 with respect to a pivot point 20. The connection between the driven wheel 16 and the associated non-driven wheel 18 is in this example realized as a bogie configuration. The bogie configuration comprises a bogie arm 22 having a first portion 23 and a second portion 24. The driven wheel 16 and the non-driven wheel 18 are pivotally connected to each other via the first portion 23 of the bogie arm 22. The bogie arm 22 is connected to absorb shocks between the chassis 12 and the wheels 16, 18 of the drive assembly 14. The second portion 24 of the bogie arm 22 comprises a horizontally protruding portion 28. A weight redistribution module 120 comprising at least one biasing member 122 is adapted to be connected to the protruding portion 28 at its first end and at a receiving portion 13 of the chassis 12 at its second end.

The biasing member 122 is configured to redistribute load from the non-driven wheel 18 to the driven wheel 16 by applying a pushing force to the driven wheel 16 towards ground 50. Due to the pivot connection 20 this will consequently result in a lifting force on the associated non-driven wheel 18. In situations wherein the drive assembly 14 does not comprise a biasing member 122, the weight of the mobile robot 10, or any object being loaded thereon, e.g. on the top module 110 or from an associated cart, is primarily distributed into the non-driven wheels 18 of the mobile robot 10. This is desired in certain cases, because it can add stability to the mobile robot and improve the driving performance. It is however not desired when heavy loads are applied to the mobile robot 10, because the normal force acting on the driven wheels 16 will not be enough to provide the required traction, as the usable traction for a wheel 16 is directly proportional to the weight acting on the wheel 16. As discussed in the background section, this has numerous fallbacks related to wheel slipping, undefined or undesired driving behavior, and/or wheel damages. The weight redistribution module(s) 120 being arranged at the one or more driven wheels 16 effectively redistributes the weight between the non-driven wheels 18 and the driven wheels 16 for providing a normal driving behavior even when the robot 10 is loaded with heavy objects, i.e. when pushing/pulling a heavy cart.

The biasing member 122, here in the form of two parallel springs, is thus mounted to press the driven wheel 16 towards the ground. The amount of pressure being applied by the biasing member 122 to the driven wheel 16 may vary depending on how much load that is arranged on the mobile robot 10, and what type of biasing member 122 is mounted thereto. The biasing member 122 may be selected from the group comprising a spring (e.g. pressure, gas, leaf or rotary springs), a pneumatic device, a hydraulic device and a pulley assembly. Generally, any type of alternative biasing member 122 may be considered, provided that it can appropriately be mounted to provide a biasing force to the driven wheel 16 such that it is pushed downwards and towards the ground 50. This improves the traction between the driven wheel 16 and the ground 50 by distributing the weights from the non-driven wheels 18 into the driven wheel 16 via the chassis 12.

As an example, the weight of the mobile robot 100 is 240 kg while the drive assembly 14, without any weight redistributing module 120, distributes a significant part of the weight to the non-driven wheels 18. Typically, the total weight is distributed more or less evenly to the wheels so that a drive configuration having six wheels (four non-driven wheels and two driven wheels) may be configured to load the wheels by approximately 40 kg each. By providing the weight redistributing module 120 some of the weight on the non-driven wheels 18 is shifted to the driven wheels 16 in order to ensure improved traction of the driven wheels 16. Typically, such redistribution module may be configured to shift the load on the wheels such that, taking the above example in mind, the total weight of 240 kg is distributed such that the driven wheels are loaded by 100 kg each, leaving only 10 kg of load to each of the non-driven wheels.

Figure 4B:
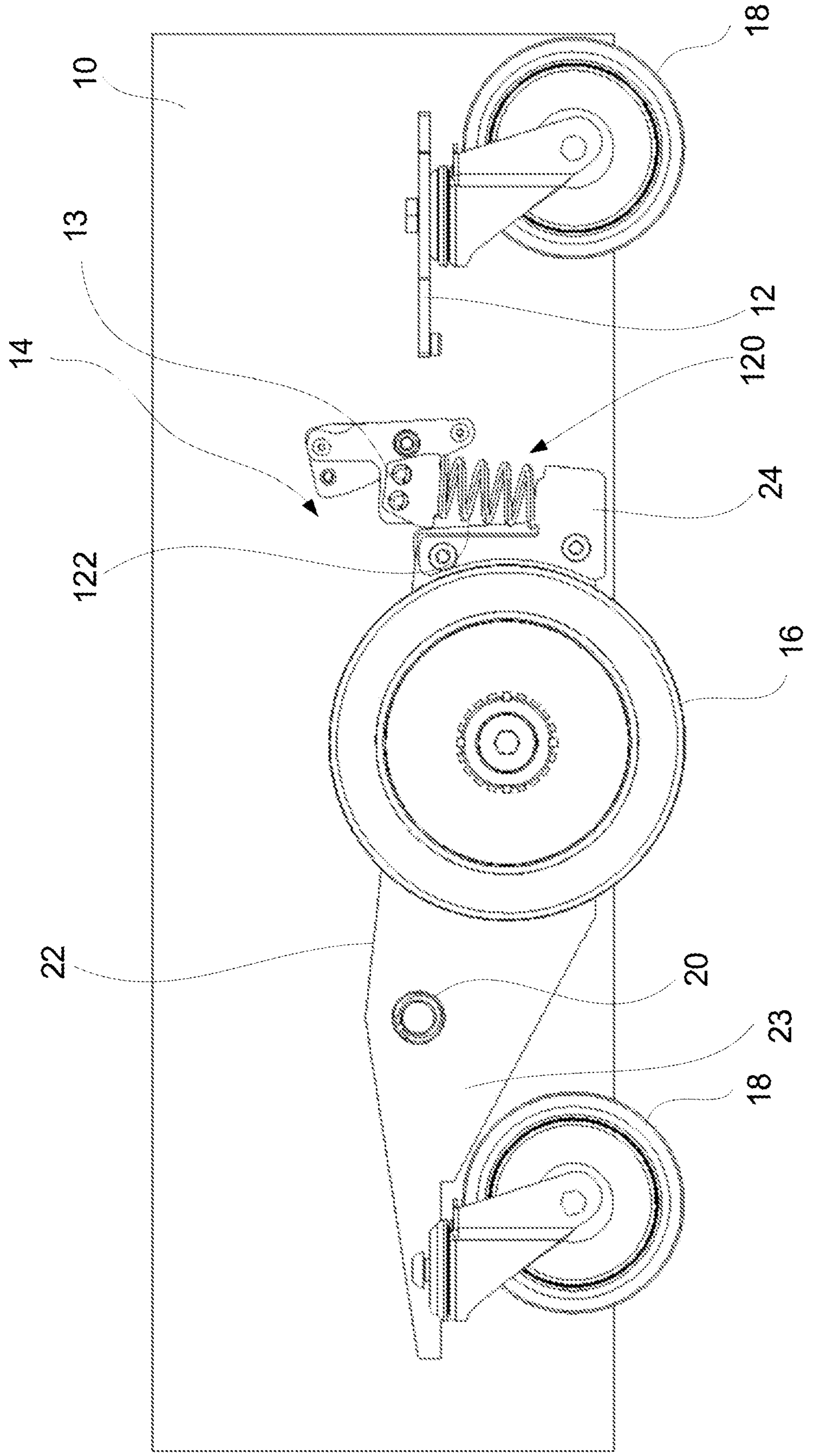
FIG. 4b is a schematic side view of a mobile robot drive assembly according to another embodiment.

Another embodiment of a drive assembly 14 of a mobile robot 10 is shown in FIG. 4*b*. Also in this embodiment the mobile robot 10 is assumed to be provided with a kit-of-parts according to an embodiment.

The drive assembly 14 comprises a non-driven wheel 18 being arranged generally at a front corner position of the mobile robot 10, and a driven wheel 16 being generally arranged in a longitudinal side position of the driving direction of the mobile robot 10, i.e. rearwise of the non-driven wheel 18. A further non-driven wheel 18 is provided at a rear corner position of the mobile robot 10. For simplification purposes, the opposite side driven wheel 16 is not shown, although a similar construction as shown in FIG. 4*b* may be realized for said opposite side driven wheel 16 as well.

The driven wheel 16 is pivotally connected to the non-driven wheel 18 with respect to a pivot point 20. The connection between the driven wheel 16 and the associated non-driven wheel 18 is in this example realized as a bogie configuration. The bogie configuration comprises a bogie arm 22 having a first portion 23 and a second portion 24. The driven wheel 16 and the non-driven wheel 18 are pivotally connected to each other via the first portion 23 of the bogie arm 22. The bogie arm 22 is connected to absorb shocks between the chassis 12 and the wheels 16, 18 of the drive assembly 14. The second portion 24 of the bogie arm 22 extends rearwise of the driven wheel 16. A weight redistribution module 120 comprising at least one biasing member 122 is adapted to be connected to the second portion 24 of the bogie arm 22 at its first end and at a receiving portion 13 of the chassis 12 at its second end.

The biasing member 122 acts in a similar manner as described with reference to FIG. 4*a*. Hence, the biasing member 122 is configured to redistribute load from the non-driven wheel 18 to the driven wheel 16 by applying a pushing force to the driven wheel 16 towards ground. Due to the pivot connection 20 this will consequently result in a lifting force on the associated non-driven wheel 18.

The biasing member 122, here in the form of a single spring, is thus mounted to press the driven wheel 16 towards the ground. The amount of pressure being applied by the biasing member 122 to the driven wheel 16 may vary depending on how much load that is arranged on the mobile robot 10, and what type of biasing member 122 is mounted thereto. The biasing member 122 may be selected from the group comprising a spring (e.g. pressure, gas, leaf or rotary springs), a pneumatic device, a hydraulic device and a pulley assembly. Generally, any type of alternative biasing member 122 may be considered, provided that it can appropriately be mounted to provide a biasing force to the driven wheel 16 such that it is pushed downwards and towards the ground.

Figure 5:
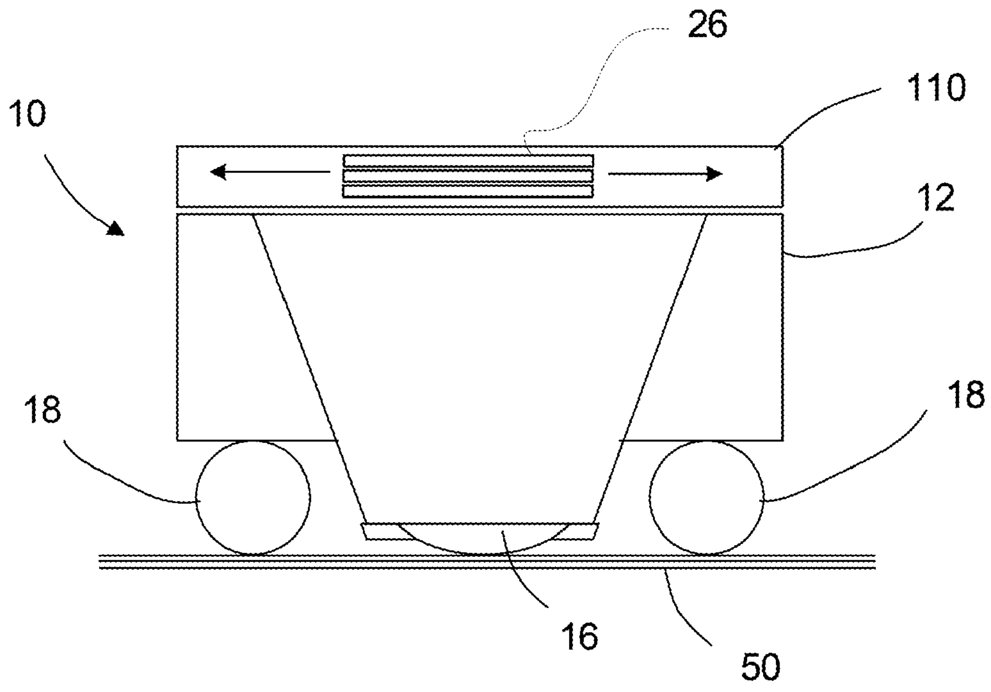
FIG. 5 is a schematic side view of a top module in a mobile robot according to an embodiment.

FIG. 5 shows a side view of a mobile robot 10 according to one embodiment. The top module 110 is configured to add additional weight to the mobile robot 10. The top module 110 may be arranged with at least one weight 26. The at least one weight 26 may be housed within exterior housing of the top module 110, arranged on top of the top module 10, hung at either side of the top module 110, and so forth. The purpose of the at least one weight 26 is to add the additional weight to the mobile robot 10, thereby increasing the traction between the wheels 16, 18 and the ground 50 by simply adding weight to the mobile robot 10.

In one embodiment, the positioning of the at least one weight 26 may be controlled. Accordingly, depending on the positioning of the at least one weight 26 with the top module 110, the center of mass of the mobile robot 10 can be shifted. The arrows at the respective sides of the weight 26 indicate this. The center of mass may vary depending on different mobile robots 10 and their respective drive assemblies and/or chassis. The top module 110 and the at least one weight 26 being arranged thereto can therefore be customized for different types of mobile robots 10 so that a controlled and well-defined center of mass can be provided. In one embodiment, the positioning of the at least one weight 26 can be adjusted/controlled depending on the load capacities of the mobile robot 10 and/or load placement location on the mobile robot 10. In one embodiment, the positioning and amount of weight of the at least one weight 26 can be dynamically adjusted during operation of the mobile robot 10. In one embodiment, the positioning and amount of weight of the at least one weight 26 can be adapted to operate in conjunction with the one or more sensor units and/or controller unit as described earlier. For instance, the sensor units can detect the weight and/or center of mass of the mobile robot 10 and the load being arranged therewith, and the controller unit can consequently instruct operator staff or an external system to adjust the placement of the weights 26, manually or autonomously.

Figure 6:
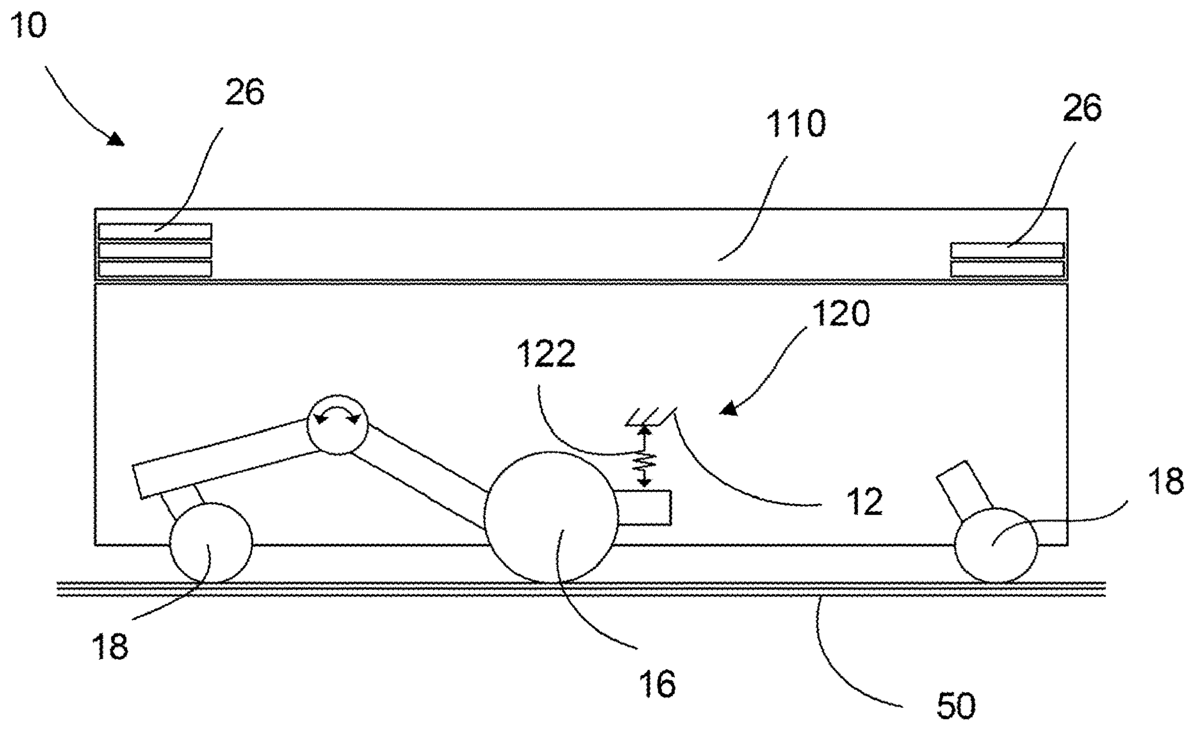
FIG. 6 is a schematic side view of a weight redistribution module and a top module in a mobile robot according to an embodiment.

FIG. 6 illustrates a mobile robot 10 being provided with a kit-of-parts comprising a top module 110 and a weight redistribution module 120, i.e. a combination of the embodiments previously described with reference to FIGS. 3 and 4.

In this embodiment, the top module 110 is arranged with a plurality of weights 26 that are distributed at different sides of the top module 110 (i.e. longitudinally) to add additional weight to the mobile robot 10. Some weights 26 are arranged at the rear of the top module 110 and some weights 26 are arranged at the front of the top module 110 (from the view perspective of the figure), to shift the center of mass more towards the front of the mobile robot 10. Additionally, the at least one weight redistribution module 120 comprises a biasing member 122 being arranged between the driven wheel 16 and the chassis 12, and configured to redistribute the load from the non-driven wheels 18 to the driven wheels 16.

The combination of using the weight redistribution module 120 to redistribute wheel load, together with arranging weights 26 in the top module 10, is a particularly inventive concept for several reasons. It is generally desired to increase the total weight of the mobile robot 10 to improve traction and thus driving performance, because the mobile robot should preferably be low of height as well as compact to be able to be used in a variety of application areas. However, since mobile robots 10 are low and compact due to different mechanisms filling up the entire chassis 12, it is often difficult to find void spaces therein. Void spaces are therefore preferably found within the top module 110, because the mechanisms therein typically do not fill up the entire space of the top module 110. Alternatively, the top module 110 can be explicitly formed to include slots for receiving additional weights 26. The weight redistribution module(s) 120 can be designed to match with the top module 110 so that the exact right amount of weight can be added to the mobile robot 10 for improving the traction, while at the same time ensuring that the weight is suitably distributed between the driven wheel(s) 16 and the non-driven wheel(s) 18. The other way around is also a possibility, i.e. customizing the amount of added weight in the top module 110 to provide the desired total weight to the robot 10 matching the mounted weight redistribution module(s) 120 of the mobile robot 10.

The goal to be achieved is therefore to add weight to the mobile robot while at the same time maintaining a desired driving behavior by shifting load from the non-driven wheels 18 to the driven wheels 16.

Hence, in accordance with the general concept described herein, a mobile robot 10 is provided. The mobile robot 10 comprises a weight redistribution module 120 configured to redistribute wheel load, in particular from one or more non-driven wheels 18 to a driven wheel 16. The mobile robot 10 further comprises a top module 110 being configured to add load to the mobile robot 10, preferably by redistributing weight from an associated cart 40 to the mobile robot 10. In an embodiment, the top module 110 comprises a transmission mechanism 30 (see FIG. 7) that acts as a lifting mechanism capable of pushing an associated cart 40 upwards, thereby causing an increased load to the mobile robot 10.

In one embodiment, the amount of pressure force provided by the weight distribution module(s) 120 to the driving wheels 16 may be restricted by a tipping point of the mobile robot 10. Because of the pivot point 20 between the driven wheel 16 and the non-driven wheel 18, tipping typically occurs when the robot is driving in the reverse direction, i.e. backwards or when backing. If the mobile robot 10 is on the verge of tipping in either direction, it may be an indication that the biasing member(s) 122 are too strong or the centre of mass is located in an improper position. This can be solved by either adding more weight to the top module 110 and/or adjusting the positioning of the weights 26 being arranged on the top module 110 to shift the center of mass. Alternatively, although less preferable, the biasing member(s) 122 may be replaced with a version that applies a less force. The subject matter of the present disclosure accordingly provides a tradeoff between adding weights 26, positioning weights 26, and redistributing the force between the wheels 16, 18.

Figure 7:
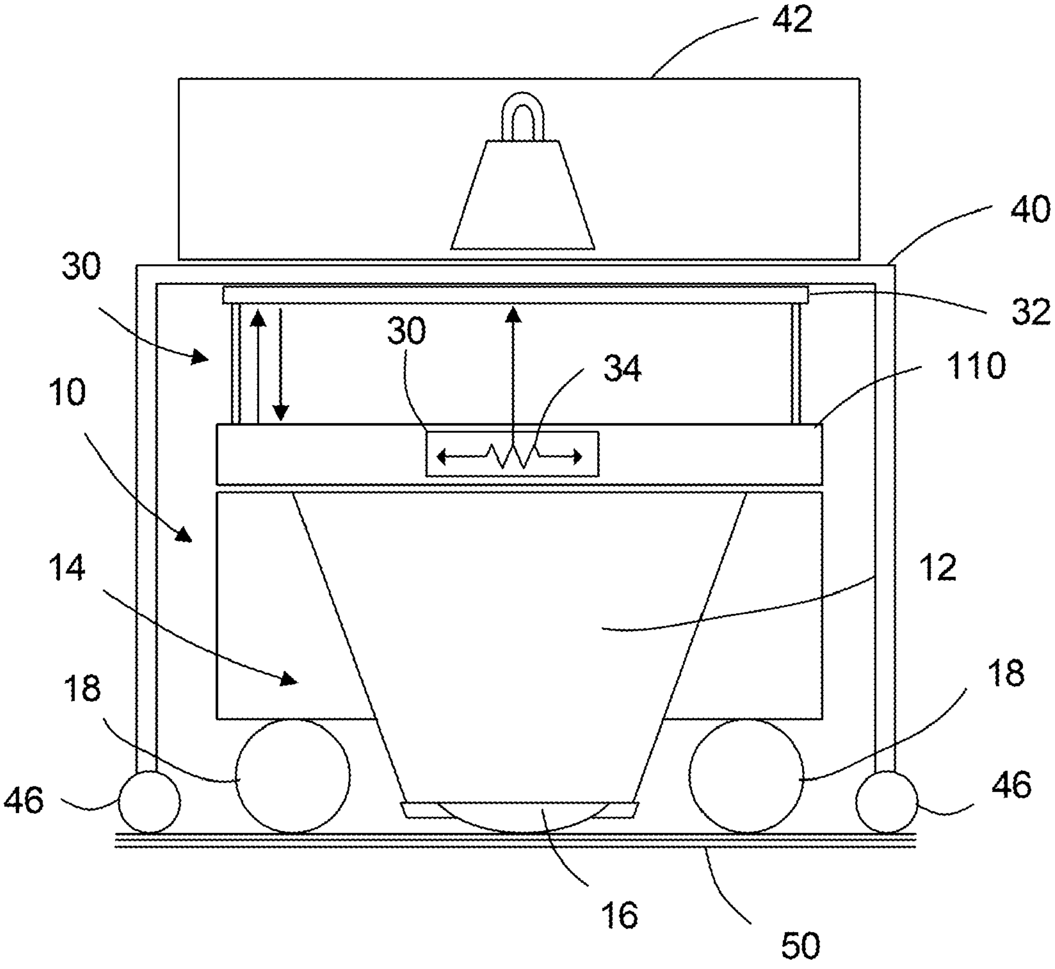
FIG. 7 is a schematic side view of a mobile robot and an associated cart according to an embodiment.

FIG. 7 illustrates an embodiment of adding additional weight to the mobile robot 10. The figure shows a schematic side view of the mobile robot 10. The mobile robot 10 is adapted to transport a cart 40 and associated goods 42 being loaded on the cart 40. The top module 110 comprises a transmission mechanism 30 being configured to lift a transmission element 32 into engagement with the associated cart 40. Accordingly, upon engagement, at least a part of the weight of the cart 40 is added as additional weight to the robot 10, thereby increasing the total weight of the robot 10.

Typically, the transmission mechanism 30 comprises one or more devices 34 for applying a force. The force applying devices 34 are mounted to apply a vertically upwards (pushing) force to the cart 40. The effect of the force applying devices 34 is that even more additional weight is added to the mobile robot 10, because parts of the weight of the cart 40 and the associated load 42 is via the top module 110 redistributed from the cart 40 to the chassis 12 of the mobile robot 10. During engagement with the cart 40 when the transmission mechanism 30 lifts the transmission element 32 from a lower to an upper position, a force is applied by the one or more force applying devices 34.

The one or more force applying devices 34 may be selected from the group comprising a spring (e.g. pressure, gas, leaf or rotary), a pneumatic device, a hydraulic device and a pulley assembly.

In preferred embodiments, the biasing member 122 of the at least one weight redistribution module 120 is configured to redistribute load between the wheels 16, 18 of the mobile robot, in accordance with FIG. 4*a* or 4*b*, and FIG. 6. Simultaneously, the top module 110 is adapted to add additional weight to the mobile robot and optionally to shift the center of mass, in accordance with FIGS. 5 to 7.

Figure 8:
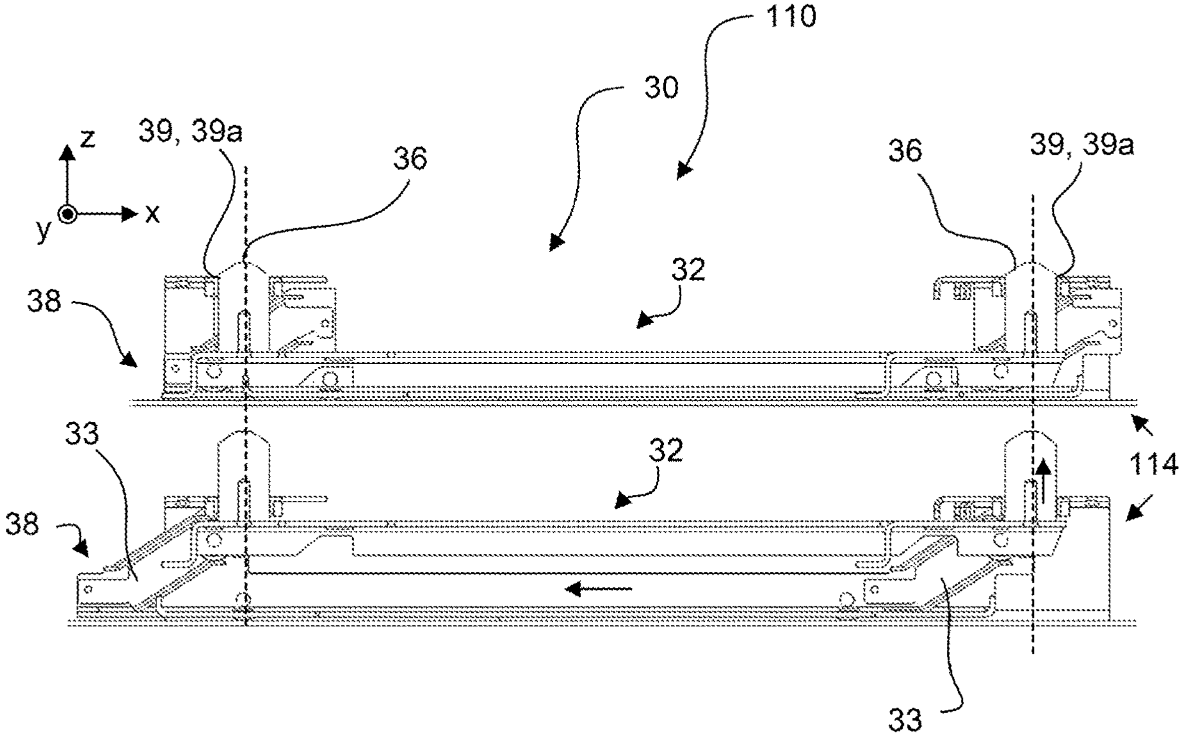
FIG. 8 is a schematic side view of a transmission mechanism in a top module according to an embodiment.

FIG. 8 shows a transmission mechanism 30 that can be used in a top module 110 according to one embodiment. An operation of elevating a transmission element 32 is shown. In the upper figure, the transmission mechanism 30 is configured to start elevation of the transmission element 32, and in the lower figure the transmission element 32 has been elevated to a vertically raised position. As is indicated by the arrows shown in the lower figure, a drive unit (not shown) has driven an actuator assembly 38 in a horizontal plane along the surface of a fixed frame 114 of the top module 110. Consequently, one or more steering members 39 of the fixed frame 114 are forcing the pins 36 of the transmission element 32 to restrict any movement of the transmission element 32 in the horizontal plane xy. Hence, the transmission element 32 is guided in the vertical plane z by following the profile of one or more vertically tilted tracks 33, and the pins 36 are extending through an opening 39*a* of each steering member 39. The pins 36 may, in their extended position, connect to an associated cart 40 by insertion in mating recesses provided in the cart 40.

Alternatively, instead of using pins 36 the transmission mechanism may comprise a horizontal surface which extends approximately along the entire horizontal extension of the top module 110. Upon actuation the horizontal surface is vertically raised, thereby allowing it to engage with a corresponding surface of the cart 40. Details of the transmission mechanism 30 is further described in WO2021/151786 by the same applicant.

Figure 9A:
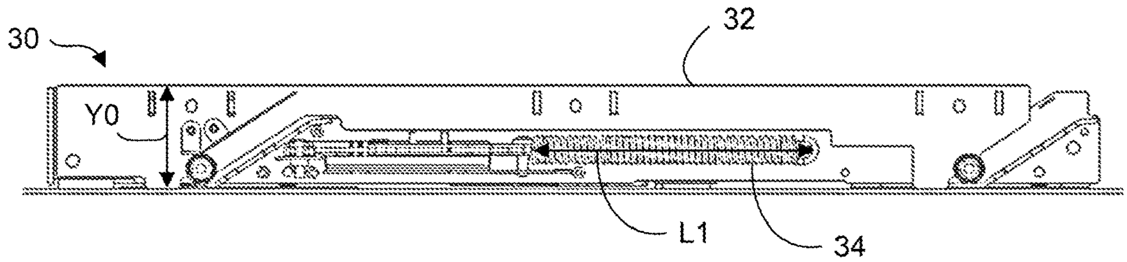
FIGS. 9a-b are respective schematic top and side views of a transmission mechanism in a top module according to an embodiment.
Figure 9B:
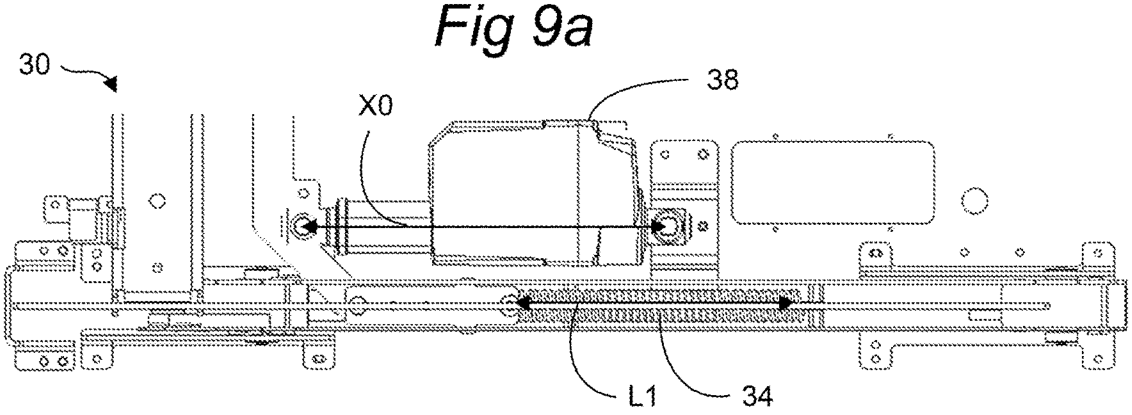
Figure 10A:
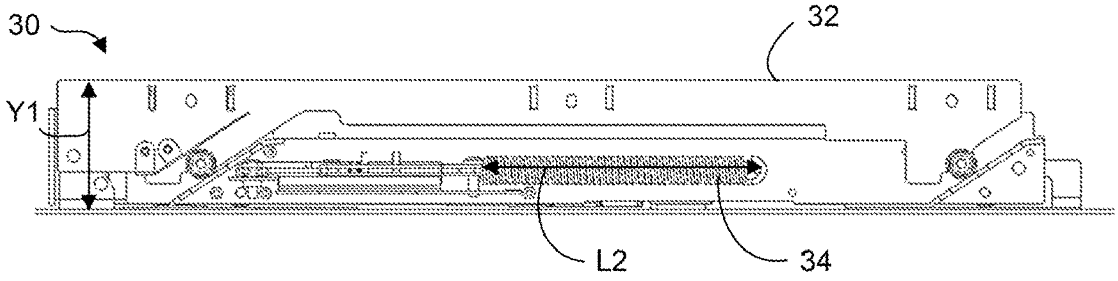
FIGS. 10a-b are respective schematic top and side views of a transmission mechanism in a top module according to an embodiment.
Figure 10B:
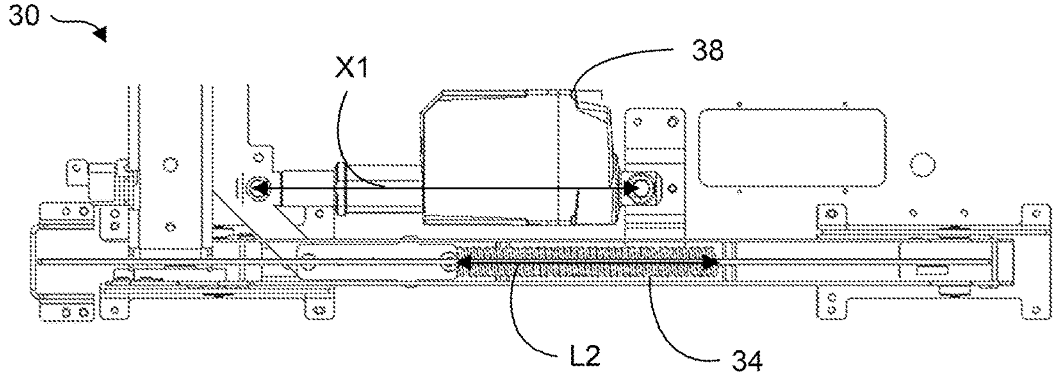
Figure 11A:
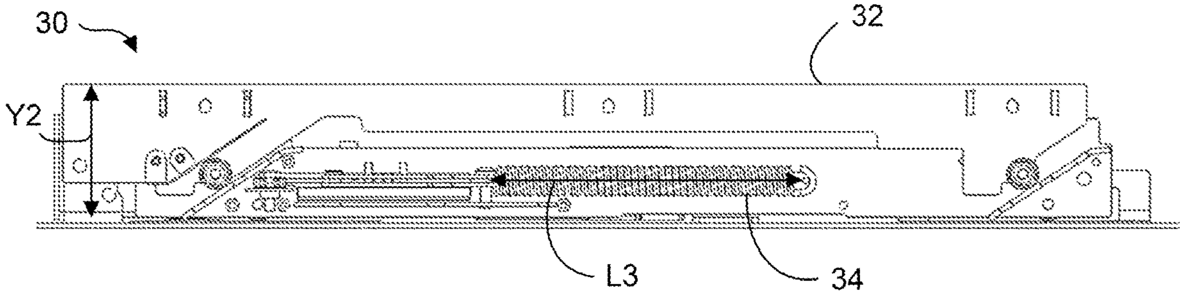
FIGS. 11a-b are respective schematic top and side views of a transmission mechanism in a top module according to an embodiment.
Figure 11B:
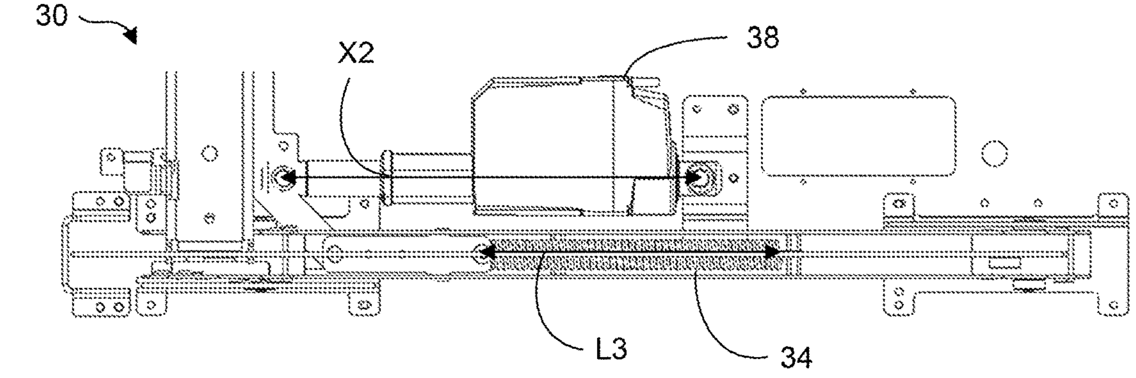

In FIGS. 9*a-b*, an embodiment of the transmission mechanism 30 as described with reference to FIG. 8 is shown in a first state, in particular being adapted to allow some of the weight of the cart 40 to be transferred to the mobile robot 10 via the top module 110. FIG. 9*a* shows a similar side view as FIG. 8, and FIG. 9*b* is a top view of FIG. 9*a*. FIGS. 10*a-b* and 11*a-b*, like FIGS. 9*a-b*, show side and top views of the transmission mechanism 30 in a second and third state, respectively. The embodiments shown in FIGS. 9*a-b*, 10*a-b* and 11*a-b* differs from the embodiment of FIG. 8 in that the transmission mechanism 30 comprises a force applying device 34. As discussed with reference to FIG. 6, the force applying device 34 is mounted to apply a vertically upwards force to an associated cart for adding additional weight to the mobile robot, preferably via pins 36 or via a horizontal surface, as described above. The force applying device 34 is arranged such that when the transmission mechanism 30 is actuated to raise the pins 36 or the horizontal surface upwards, a vertically force upwards will be applied thereby resulting in a counteracting normal force downwards. Hence, some of the weight of the cart 40 (corresponding to the applied force) will be carried by the top module 110. In the present example, the force applying device 34 is depicted as an actuator 38 and a spring being coupled to the actuator 38.

Actuation of the force applying device 34 may be accomplished in different ways, as long as it is allowed to push the transmission mechanism 30 of the top module 110 upwards. For example, the transmission mechanism 30 may be configured to drive the pins 36 or the horizontal surface upwards until it comes into contact with the cart 40, whereby the force applying device 34 is pushing the pins 36 or the horizontal surface upwards. The force is applied by the actuator 38, which also loads the spring to always push the top module 110 into contact with the cart 40. When the actuator 38 is deactivated, the spring will return to its idle state, thereby allowing the top module 110 to lower to disengage with the cart 40.

The relationships between the position parameters X, Y is as follows: $Y0<Y1=Y2$, $X0<X1=X2$; and the relationship between the length parameter L is as follows: $L1=L2<L3$. In the first state shown in FIGS. 9*a-b*, the transmission element 32 is in a lower position Y0 corresponding to the actuator assembly 38 being in the leftmost position X0 in the perspective of the image, and the spring 34 being in a resting position corresponding to the length L1. In the second state shown in FIGS. 10*a-b*, the transmission element 32 is in an upper position Y1 corresponding to the actuator assembly 38 being in the rightmost position X1 in the perspective of the image, and the spring of the force applying device 34 has been moved, without being loaded, to an idle position. In the third state shown in FIGS. 11*a-b*, the transmission element 32 is still in the upper position $Y1=Y2$ which corresponds to the actuator assembly 38 being in the rightmost position $X1=X2$ in the perspective of the image, and the spring 34 ensures contact between the top module 110 and the associated cart 40.

Figure 12:
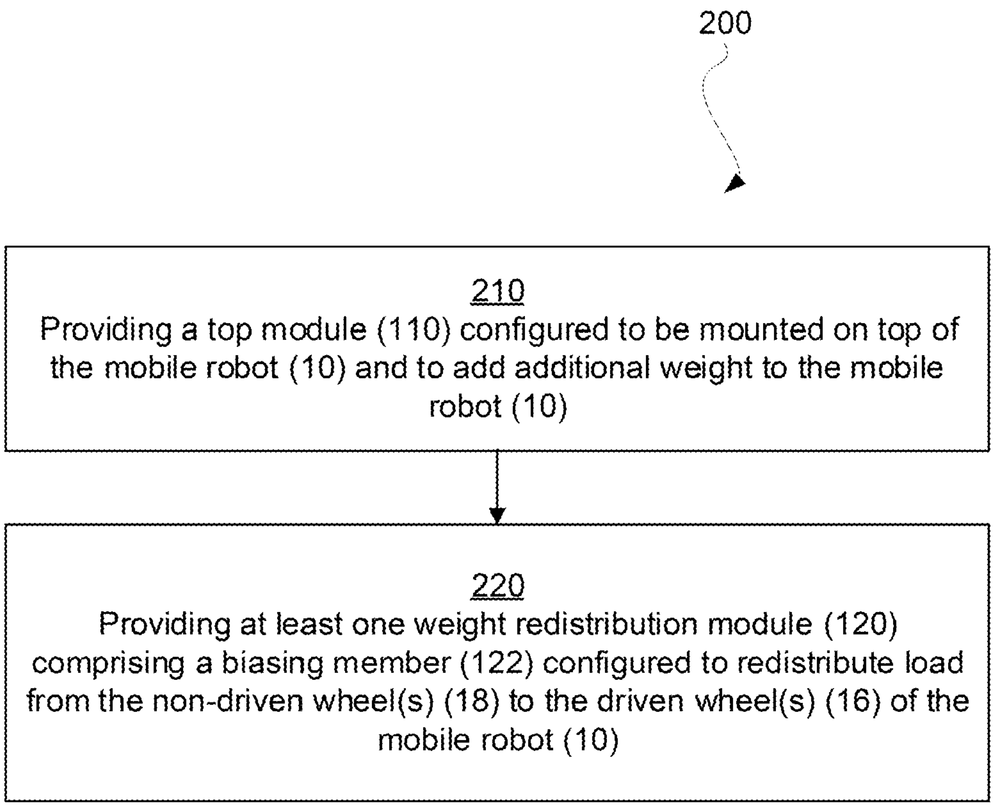
FIG. 12 is a schematic block diagram of a method for use with a mobile robot according to one embodiment.

Finally, in FIG. 12 a method 200 is schematically shown. The method 200 is performed with a mobile robot 10 as described above, i.e. comprising a chassis 12 and a drive assembly 14 having at least one driven wheel 16 and at least one non-driven wheel 18. The method 200 comprises the step of providing a top module 110 configured to be mounted on top of the mobile robot 10 and to add additional weight to the mobile robot 10, and a step of providing at least one weight redistribution module 120 comprising a biasing member 122 configured to redistribute load from the non-driven wheel(s) 18 to the driven wheel(s) 16 of the mobile robot 10.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A kit of parts (100) for use with a mobile robot (10) comprising a chassis (12) and a drive assembly (14) having at least one driven wheel (16) and at least one non-driven wheel (18), said kit of parts (100) comprising a top module (110) configured to be mounted on top of the mobile robot (10) and to add additional weight to the mobile robot (10), and at least one weight redistribution module (120) comprising a biasing member (122) configured to redistribute load from the non-driven wheel(s) (18) to the driven wheel(s) (16) of the mobile robot (10).

2. The kit of parts (100) according to claim 1, wherein each driven wheel (16) is pivotally connected to an associated non-driven wheel (18) with respect to a pivot point (20).

3. The kit of parts (100) according to claim 1, wherein the biasing member (122) is mounted to press the at least one driven wheel (16) towards the ground.

4. The kit of parts (100) according to claim 1, wherein the biasing member (122) is connected to the at least one driven wheel (16) and to the chassis (12).

5. The kit of parts (100) according to claim 1, wherein each driven wheel (16) is pivotally connected to an associated non-driven wheel (18) by means of a bogie arm (22).

6. The kit of parts (100) according to claim 5, wherein each bogie arm (22) comprises a protruding portion (28), wherein the biasing member (122) is connected to the protruding portion (28) at a first end and to the chassis (12) at a second end.

7. The kit of parts (100) according to claim 1, wherein the biasing member (34) is selected from the group comprising a spring, a pneumatic device, a hydraulic device and a pulley assembly.

8. The kit of parts (100) according to claim 1, wherein the top module (110) comprises at least one weight (26) being mounted to add the additional weight to the mobile robot (10).

9. The kit of parts (100) according to claim 8, wherein the at least one weight (26) is arranged to shift the center of mass of the mobile robot (10).

10. The kit of parts (100) according to claim 1, wherein the top module (110) comprises a transmission mechanism (30) configured to lift a transmission element (32) into engagement with an associated cart (40) for adding at least at least a part of the weight of the cart (40) as additional weight to the mobile robot (10).

11. The kit of parts (100) according to claim 10, wherein the transmission mechanism (30) comprises one or more force applying devices (34) being mounted to apply a vertically upwards force to the cart (40) for adding additional weight to the mobile robot (10).

12. The kit of parts (100) according to claim 1, wherein the one or more force applying devices (34) is selected from the group comprising a spring, a pneumatic device, a hydraulic device and a pulley assembly.

13. A mobile robot (110) comprising a kit of parts (100) according to claim 1.

14. A method (200) for use with a mobile robot (10) comprising a chassis (12) and a drive assembly (14) having at least one driven wheel (16) and at least one non-driven wheel (18), said method (200) involving providing a top module (110) configured to be mounted on top of the mobile robot (10) and to add additional weight to the mobile robot (10), and providing at least one weight redistribution module (120) comprising a biasing member (122) configured to redistribute load from the non-driven wheel(s) (18) to the driven wheel(s) (16) of the mobile robot (10).

* * * * *